United States Patent
Warkentin

Patent Number: 5,181,596
Date of Patent: Jan. 26, 1993

[54] OFF-LOADING CONVEYING SYSTEM

[76] Inventor: A. James Warkentin, 13551 View Dr., Orange Cove, Calif. 93646

[21] Appl. No.: 697,327

[22] Filed: May 8, 1991

Related U.S. Application Data

[63] Continuation-in-part of Ser. No. 601,137, Oct. 19, 1990, abandoned.

[51] Int. Cl.⁵ .............................................. B65G 37/00
[52] U.S. Cl. .................................... 198/365; 198/370; 198/387; 198/779; 209/698; 209/701
[58] Field of Search .......... 198/365, 370, 387, 477.1, 198/779; 209/698, 701

[56] References Cited

U.S. PATENT DOCUMENTS

| | | | |
|---|---|---|---|
| 2,359,641 | 10/1944 | Harlow | 198/779 X |
| 3,370,692 | 2/1968 | Mosterd | 198/779 X |
| 3,489,278 | 1/1970 | Alexander | 209/701 X |
| 3,581,891 | 6/1971 | Rysti | 209/74 |
| 3,768,645 | 10/1973 | Conway et al. | 209/111.5 |
| 3,930,995 | 1/1976 | Paddock et al. | 209/74 |
| 4,033,450 | 7/1977 | Paddock et al. | 198/648 |
| 4,106,628 | 8/1978 | Warentin et al. | 209/74 |
| 4,254,877 | 3/1981 | Rose | 209/594 |
| 4,358,009 | 11/1982 | Rysti | 198/365 |
| 4,410,079 | 10/1983 | Niederer et al. | 198/779 X |
| 4,569,434 | 2/1986 | Horii et al. | 198/365 |
| 4,586,613 | 5/1986 | Horii et al. | 209/556 |
| 4,726,898 | 2/1988 | Mills et al. | 209/545 |
| 4,940,536 | 7/1990 | Cowlin et al. | 209/698 X |
| 4,961,489 | 10/1990 | Warkentin | 198/365 |
| 4,981,205 | 1/1991 | Cowlin | 198/387 |
| 5,029,692 | 7/1991 | Warkentin | 198/365 |

FOREIGN PATENT DOCUMENTS

WO89/8510 12/1989 PCT Int'l Appl.

Primary Examiner—Joseph E. Valenza
Assistant Examiner—Tuan N. Nguyen
Attorney, Agent, or Firm—Lyon & Lyon

[57] ABSTRACT

An off-loading conveyor including a support structure mounting an endless chain to extend along a conveying path. Roller carriages including roller mounts and laterally extending elements are pivotally mounted to the chain on either side thereof. The laterally extending elements and the laterally extending rollers define cavities for receipt of conveyed product units. The roller carriages and associated rollers are positionable in a first, conveying position and a second, off-loading position. The roller carriages rotate downwardly about axes extending laterally of the chain to achieve the second, off-loading position. Control members pivotally mounted to the chain selectively control rotation of the roller carriages from the first to the second positions upon actuation by a solenoid cam mechanism.

61 Claims, 4 Drawing Sheets

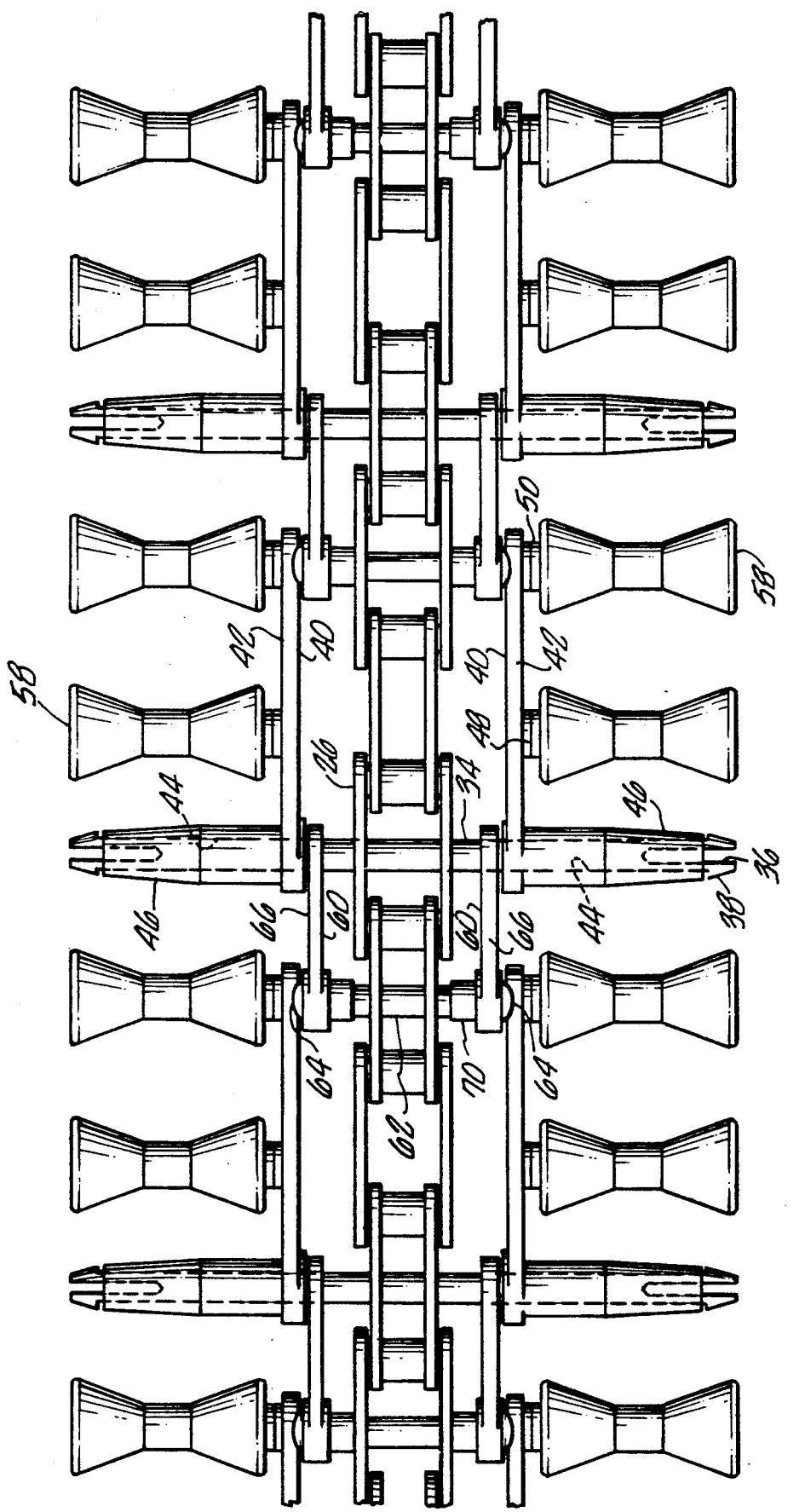

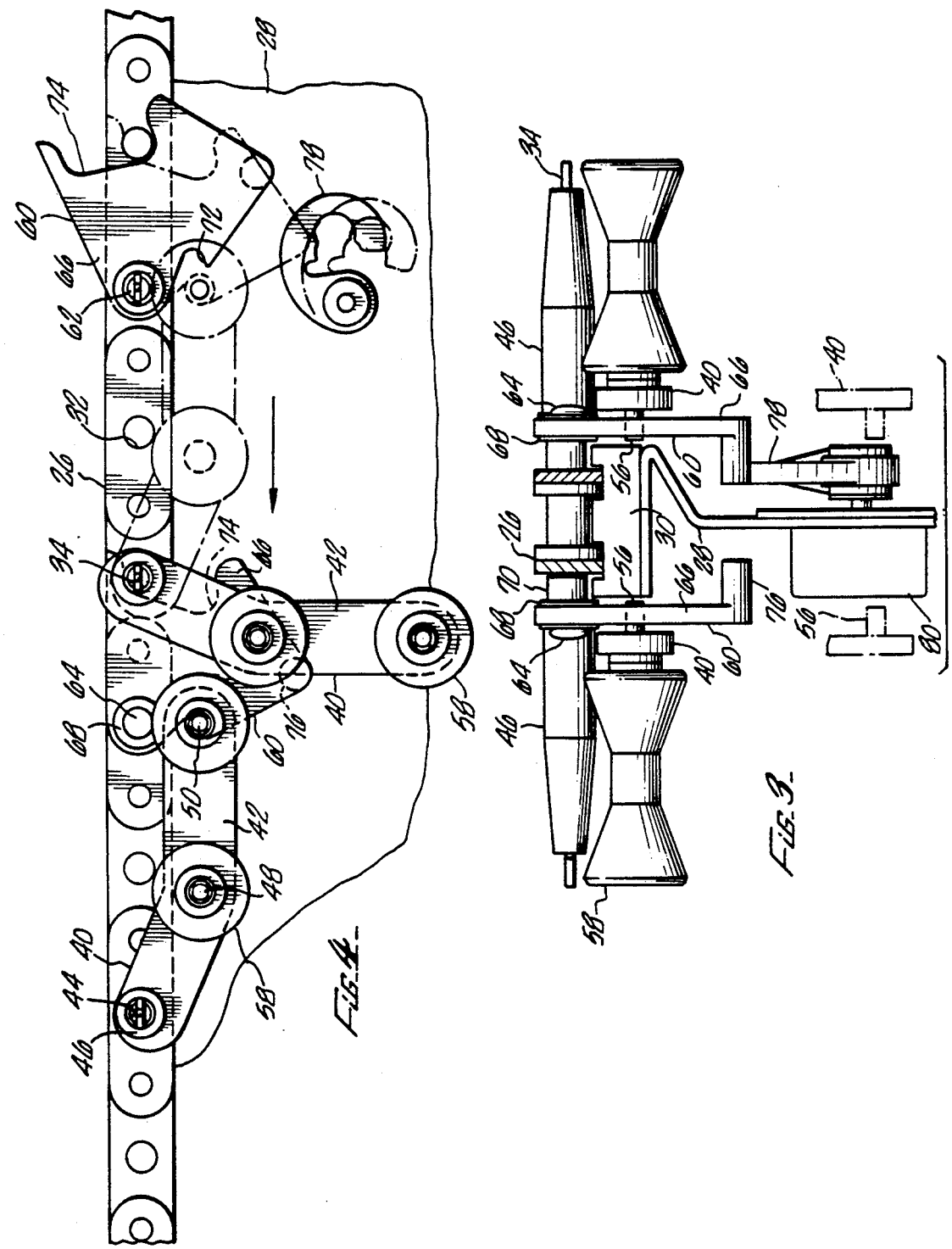

OFF-LOADING CONVEYING SYSTEM

This is a continuation-in-part the U.S. patent application Ser. No. 601,137, filed on Oct. 19, 1990 now abandoned.

BACKGROUND OF THE INVENTION

The field of the present invention is conveying systems wherein the conveyor is actively operative to off-load products therefrom.

Product handling activities for the discrimination of product units have long been used, particularly in the food product industry. Such discrimination has been based on size, ripeness, color, blemishes and the like. Until recent times, this activity was generally undertaken by manual labor. The versatility of workers for handling and processing large amounts and varieties of food products has generally been unsurpassed. Such processing systems generally include conveyor passing working stations where workers were able to distinguish and separate product units. Such labor was generally inexpensive and seasonal. However, difficulties in finding experienced seasonal workers and the normal administrative problems associated with the fluctuating work force have long created a need for less labor intensive systems.

In defining the needs for product handling systems, as particularly applied to the food industry, the nature, volume, relative unit cost and variety of products severely inhibit the design of handling equipment. Most food products must be handled with great care to avoid damage. The perishable nature and large batch quantities of products in season make rapid processing a necessity. The variety of products which must be processed at different times to economically justify a food processing facility places great demand for versatility on the equipment. Thus, a substantial challenge exists in creating handling equipment to replace the versatile human worker.

Recently, high speed electronics and sophisticated software have provided increasing sensing capability for detecting size and condition of individual product units and rapidly activating responsive mechanisms to proceed to handle such products. However, such systems require a more exacting placement of the product units, a separation of product units, proper orientation and reorientation of product units and means for quickly but gently separating units one from another. The demands for such exacting placement, control and operation are orders of magnitude more stringent than for manual processing. Thus, the design of handling systems has resulted in compromises in speed, efficiency and product treatment.

An earlier system for handling of products in a manner acceptable for automatic sorting is disclosed in U.S. Pat. No. 4,106,628 to Warkentin et al. for SORTER FOR FRUIT AND THE LIKE, the disclosure of which is incorporated herein by reference. In this patented device, cups are arranged on a chain conveyor for holding individual product units. Solenoids act to dump selected cups for product separation responsive to discriminating sensing and electronic commands. Other separating systems include devices for batting or blowing selected units from a conveyor.

Another system which has been in use now for some time is disclosed in U.S. Pat. No. 4,961,489 entitled PRODUCT HANDLING SYSTEM, the disclosure of which is incorporated herein by reference. In this device, a conveyor is employed which includes elements capable of tipping to off-load individual units of a product being processed. The nature of the conveyor permits some variety in shapes and sizes, including elongated products. However, a range of round or oval products in smaller sizes is not as easily accommodated by this system.

A further system which has been in use now for some time is disclosed in U.S. patent application Ser. No. 200,407, filed May 31, 1988 and entitled OFF-LOADING CONVEYING SYSTEM, the disclosure of which is incorporated herein by reference. In the device disclosed therein, a conveyor is employed which has the support structure defining a conveying path, an endless chain mounted on the support structure, bowtie rollers mounted on the chain and paddles pivotally mounted relative to the chain between adjacent bowtie rollers. The paddles operate to sweep through the cavities defined by the bowtie rollers to off-load product resting between two adjacent bowtie rollers.

SUMMARY OF THE INVENTION

The present invention is directed to the conveying and selective off-loading of product units such as produce. Cavities are defined by elements of the conveyor for receipt of product units for conveying past a sensing mechanism. The cavities include rollers which can provide the capacity to rotate the product units. The supporting rollers are movable to remove support from product units at selected off-loading positions. Control members operate to control such off-loading.

In a first aspect of the present invention, rollers are associated with a plurality of carriages with the carriages movably attached to a conveyor chain. Control members for controlling the carriages are also mounted to the chain. The cavities defined by the rollers can simulate a form of cup for retaining, accurately rotating and discharging product units therefrom while being conveyed along a conveying path. The rollers in association with control members mounted to the chain provide for narrow conveyor widths more compatible with existing processing equipment. Such control members avoid significant collision points between stationary controlling elements and the moving conveyor.

In a further aspect of the present invention, an endless chain mounts laterally extending members, mounts and rollers mounted to the mounts. Rollers are positioned between the laterally extending members in such a way that cavities are formed from these elements. Again, retaining, rotating and off-loading are provided to the product units. With the laterally extending members, accurate control of product unit rotation independently of products in adjacent cavities becomes possible. Such rotation is advantageous for accurate product shape determination, more accurate sizing based on cross section, more accurate color sorting and blemish grading.

In another aspect of the present invention, off-loading of the product units is controlled as to speed of off-loading, impact and guidance. Ramps are positioned beneath the conveyor to first receive a roller on the carriage and then the product unit. The ramp can, thereby, control the discharge rate, the height the product unit must fall to the ramp and the direction in which the off-loaded product unit can be diverted.

Accordingly, it is an object of the present invention to provide an improved off-loading conveyor system.

Other and further objects and advantages will appear hereinafter.

BRIEF DESCRIPTION OF THE DRAWINGS

FIG. 2 is a plan view of a conveyor of the present invention.

FIG. 3 is a cross-sectional end view of the conveyor of FIG. 2.

FIG. 4 is a partial side view of the conveyor of FIG. 2.

DETAILED DESCRIPTION OF THE PREFERRED EMBODIMENT

Figure 1:
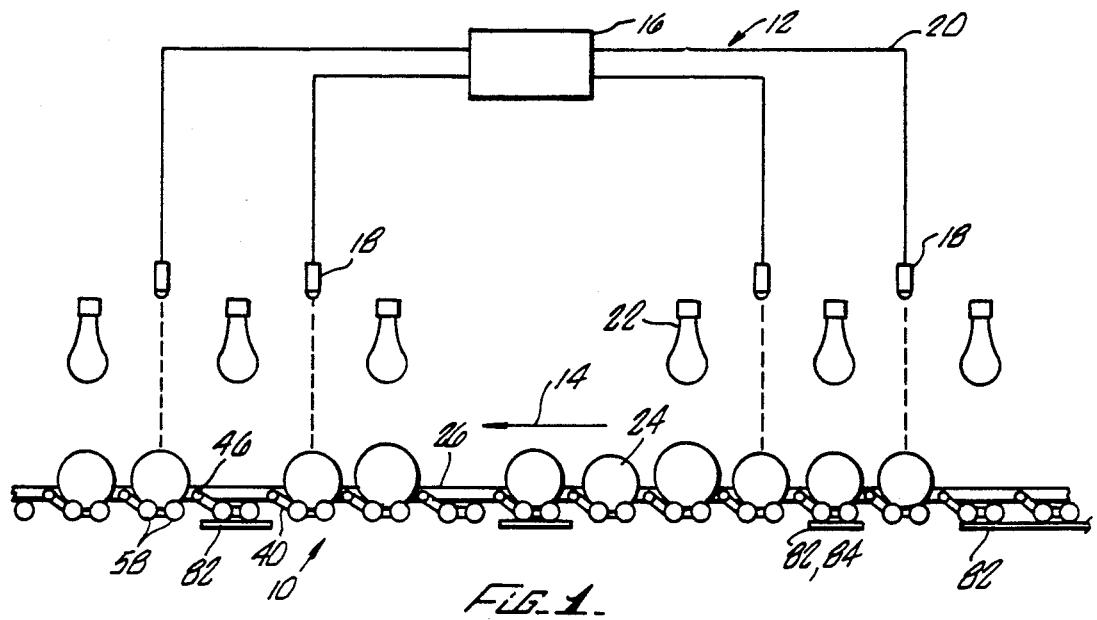
FIG. 1 is a schematic view of a conveying system of the present invention in association with a sensing system.

Turning in detail to the drawings, FIG. 1 illustrates a conveying system in schematic view. The conveying system includes a conveyor, generally designated 10, and a sensing system, generally designated 12. The conveyor 10 is arranged in an endless loop which moves along a portion of its length on a conveying path as indicated by an arrow 14 in FIG. 1. The sensing system 12 is located above the conveying path of the conveyor 10 and includes a processing unit 16, sensors 18 and connecting optic fiber or electric conduit 20. Lights 22 are arranged to illuminate product units 24 located on the conveyor 10. The sensors 18 are conventionally shielded from the lights 22.

Referring more specifically to the conveyor 10, reference is made to FIGS. 2, 3 and 4. The conveyor 10 includes an endless roller chain 26. The endless roller chain 26 is supported on a support structure 28 having a low friction track 30. The track 30 receives the chain links along the upper, conveying path. The links of the chains 26 include holes 32 which extend laterally in a centered position through each link. The chain is driven through a conventional sprocket (not shown) which is in turn driven by an electric motor (also not shown).

Pins 34 are fixed to the chain 26 through certain of the holes 32. These pins 34 are shown to be positioned on every third link. The pins 34 extend laterally to split ends 36 which include locking barbs 38.

Figure 5:
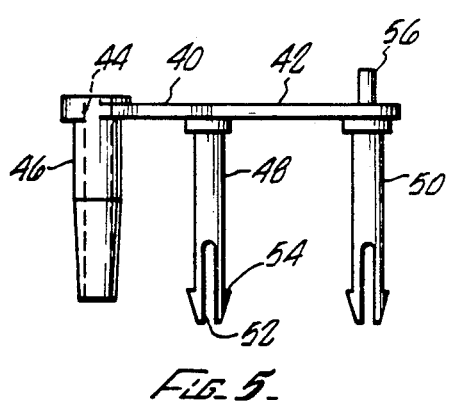
FIG. 5 is a plan view of a roller carriage of the conveyor of FIG. 2.
Figure 6:
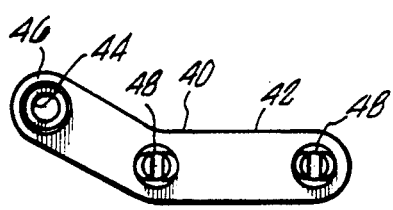
FIG. 6 is a side view of the roller carriage of FIG. 5.

Mounted on the pins 34 are right and left-hand roller carriages 40. The roller carriages 40 are best illustrated in FIGS. 5 and 6. A right-hand carriage 40 is illustrated. The carriage 40 includes a mount 42. At one end of the mount 42 is a mounting hole 44 to receive the pin 34.

Concentrically aligned with the mounting hole 44 is an elongate member 46. The elongate member 46 extends laterally from the mount 42 and is generally circular with a tapered distal end. This taper defines a tapered surface that, on the upper side of the elongate member, tapers downwardly and outwardly to assist in off-loading of product units as will be discussed below.

Also extending laterally from each roller carriage 40 in the same direction as the elongate member 46 are two roller mounting pins 48 and 50. The pins 48 and 50 also have split ends 52 and locking barbs 54. The roller mounting pins 48 and 50 may be considered to lie in a reference plane extending through the centerlines thereof. The mounting hole 44 and the elongate member 46 are shown to be displaced to one side of that reference plane as best illustrated in FIG. 6.

Finally, a control pin 56 extends laterally from the mount 42. This pin 56 is shown to extend in the opposite direction from the roller mounting pins 48 and 50 and aligned with the roller mounting pin 50. It is displaced from the mounting hole 44.

Arranged on each of the roller mounting pins 48 and 50 is a bowtie roller 58. The bowtie rollers 58 have a center mounting hole through which the roller mounting pins 48 and 50 extend with the locking barbs 54 engaging the shoulder at one end of the hole. The elongate member 46 is shown to extend laterally from the chain substantially the same distance as the bowtie rollers 58. As best illustrated in FIG. 4, the mount 42 of each roller carriage 40 is movably mounted relative to the chain 26.

Two positions are illustrated for the carriages 40. In a first, conveying position, the roller mounting pins 48 and 50 and associated rollers 58 are arranged such that the reference plane extending through the centerlines thereof is substantially parallel to the chain 26. The configuration of the mount 42 as noted above places the roller mounting pins 48 and 50 and the rollers 58 at a position below the chain 26. FIG. 4 illustrates a portion of the endless conveyor along the conveying path. Located above this reference plane defined through the roller mounting pins 48 and 50 are the elongate members 46 mounted about the pins 34. In a second, off-loading position, the mount 42 extends substantially downwardly from the chain 26 and is displaced from the cavity defined by the elements in the first, conveying position.

The rollers 58, because of their shape and adjacent positioning on the roller mounting pins 48 and 50, define a cavity between adjacent rollers. This cavity is open between the two rollers 58 but defines a concave seat for the receipt of product units 24 large enough to not fall between the rollers 58. Because the rollers 58 are positioned below the elongate members 46 in a first, conveying position, a cavity may also be defined as including both the adjacent rollers 58 mounted to a single mount 42 and the adjacent elongate members 46 to either side of these rollers 58.

The cavity thus defined is a discrete conveyor unit somewhat in the nature of a cup. Through singulation of product and placement of a single product unit 24 between each adjacent elongate members 46, the product units 24 so positioned may be conveyed, rotated without interference from adjacent product units 24, weighed and optically sensed on a plurality of sides while the carriage 40 is in the first, conveying position and selectively discharged by movement of the carriage 40 to the second, off-loading position.

Figure 7:
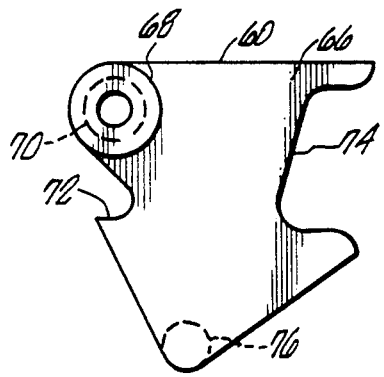
FIG. 7 is a side view of a control member of the conveyor of FIG. 2.
Figure 8:
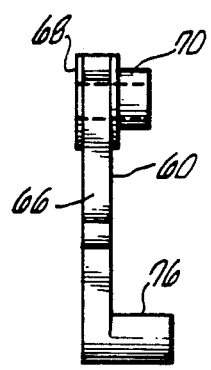
FIG. 8 is an end view of the control member of FIG. 7.

To control the position of the roller carriages 40 between the first, conveying position and the second, off-loading position, control members 60 are mounted to the chain 26. Each control member 60 is mounted to the chain by means of a pin 62 which is in turn mounted through a hole 32 in a link of the roller chain 26. Screws 64 are positioned in the ends of the pin 62 to retain the control member 60 such that they can pivot relative to the chain 26. The control members 60 are individually illustrated in FIGS. 7 and 8. A right-handed such control member 60 is illustrated and left-handed control members are also contemplated for the other side of the chain 26.

Each control member 60 is defined by a plate 66 through which a bearing 68 extends. The bearing is mounted about the pin 62 and is conveniently formed integrally with the plate 66. A spacer 70 holds the plate 66 away from the chain 26. The plate includes a hook 72 and a guide slot 74. The hook 72 is designed to engage the control pin 56 when the roller carriage 40 is in the first, conveying position. The guide slot 74 extends to the pin 34 most adjacent the control member 60. The slot 74 limits the rotational travel of the control member 60 through its interference with that pin 34.

The configuration of the control member 60 is such that the center of gravity is located to one side of the bearing 68. Consequently, the control member 60 is naturally biased to rotate toward the hook 72 which then engages the control pin 56 when the control member 60 is on the upper, conveying path of the chain 26. A guide element beneath the rollers designed to retain the rollers in the first, conveying position along with the weight bias of the control members 60 insures engagement between the control members 60 and the control pins 56 as the chain moves along the conveying path.

Extending laterally from the plate 66 at the bottom end of the control member 60 is a trip pin 76. A solenoid cam 78 associated with a solenoid 80 is operatively positioned on the support structure 28 such that when the solenoid 80 is activated, the solenoid cam 78 extends upwardly to interfere with the passage of the trip pin 76. This causes the control member 60 to pivot such that the hook 72 releases the control pin 56 and allows the roller carriage 40 to move from the cavity defined by the rollers 58 with the carriage 40 in the first, conveying position. The carriage 40 pivots downwardly to a second, off-loading position in a manner that allows any product unit 24 contained within the cavity between the elongate members 46 to fall from the conveyor.

A plurality of solenoid cams 78 may be positioned along the conveyor after the sensing system 12. Such cams 78 would be associated with individual bins, off-loading ramps, conveyors or packing stations. The sensing system 12 through the processing unit 16 is to control the solenoids 80 which in turn actuate the solenoid cam 78. Through appropriate programming, discrimination of product units 24 on the conveyor 10 may then allow off-loading at specific off-loading stations through actuation of the solenoid cams 78.

As noted above, the support structure 28 provides support for the endless roller chain 26 by means of the track 30. Frequently a plurality of chain conveyors are arranged adjacent one another and driven by the same shaft. Consequently, such conveyors move in unison. This makes possible cooperation between conveyors. For example, the pins 34 may extend between conveyor chains 26. Such a cooperation between conveyor chains 26 would act to prevent any tipping of each individual chain conveyor due to off-center loading or the like.

To additionally provide controlled rotation of product units 24 located within the cavities of the conveyor 10, rotation tracks 82 may be positioned beneath the rollers 58. The rotation tracks 82 may be positioned in the center of the bowtie rollers for more rapid rotation or at the outer periphery for slower rotation. Further, the tracks 82 may themselves be moving belts to increase, decrease or even reverse the speed of rotation of product units 24 conveyed on the conveyor.

A weigh station 84 may also be employed as is well known in cup sizers. The station would be positioned beneath the conveyor and lift the rollers enough so that the control pins 56 are raised off of the hooks 72. The station should be of sufficient length to span the two rollers 58 associated with the same carriage 40. Such a weigh station may double as a rotation track 82.

In a preferred embodiment, the scale of the equipment has been designed for fruit having a nominal spherical diameter of from 2 inches to 4¼ inches. Based on this range of nominal product unit sizes, the conveyor has been designed with cavity sizes defined center-to-center between repeating elements, e.g., the elongate members 46, of 4½ inches. In width, from the center of one bowtie roller 58 to another, the dimension is 5 inches. This may be repeated with additional adjacent conveyors. That is, moving laterally across a conveyor having multiple such chains and conveying systems, the center to center distances between laterally adjacent bowtie rollers 58 would be 5 inches. The capacity of this equipment to be this compact and to have a conveying speed allowed by available sensing equipment can give this conveying arrangement the ability to fit into current processing lines without requiring an outward fanning of the incoming product units and subsequent convergence of those units at discharge. Aside from the chain, the conveyor elements mounted to the chain are conveniently of dimensionally stable, high impact molded plastic.

In operation, product units may be singulated onto the moving conveyor 10 by any one of a wide number of available singulating mechanisms. The roller carriages 40 on the endless chain 26 are drawn by gravity when on the return upside down length of the conveyor to the first, conveying position. As these carriages 40 are drawn around the sprocket, they may be retained by a supporting surface to remain in the first, conveying position while the control members 60 swing to engage the hooks 72 with the control pins 56. The singulated fruit is then deposited upon the conveyor 10 and becomes positioned in the cavities defined between adjacent elongate members 46.

The rollers may engage a first rotation track 82 which causes the rollers 58 and in turn any product unit 24 supported by the rollers 58 to rotate and become properly seated in a cavity. One or more optical sensings of the product units 24 may then be undertaken. If more than one view is to be taken, it would typically be advantageous to include further rotation tracks 82 between views.

Because the product units are positioned in individual cavities, it is possible to effect a controlled average amount of rotation in each product unit 24 without affecting any other product unit 24. Thus, the product units 24 may be stopped from rotating during the period that they are being viewed. A weigh station 84 may also measure the weight of a product unit 24 in a conveyor cavity in a conventional manner.

Once having been scanned and weighed, the product units 24 are conveyed to off-loading stations where one of the sensing mechanisms will command off-loading of the product unit. At this point, the solenoid 80 will activate causing the solenoid cam 78 to raise and come into interference with the trip pin 76. The roller carriage 40 then drops to allow the product unit contained within that cavity to roll downwardly into a waiting bin, off-loading conveyor, chute or the like.

The product units which are two large to directly fit between the elongate members 46 have the propensity to roll away from the chain 26 and off-load once the rollers have been moved to the second, off-loading position by virtue of the upper tapered surfaces of the elongate members 46.

The product units selected for off-loading intermediate the ends of the conveyor 10 may be desired products graded according to physical attribute or rejects or both. A final category may simply continue on across the conveyor 10 and off at the end thereof.

Figure 9:
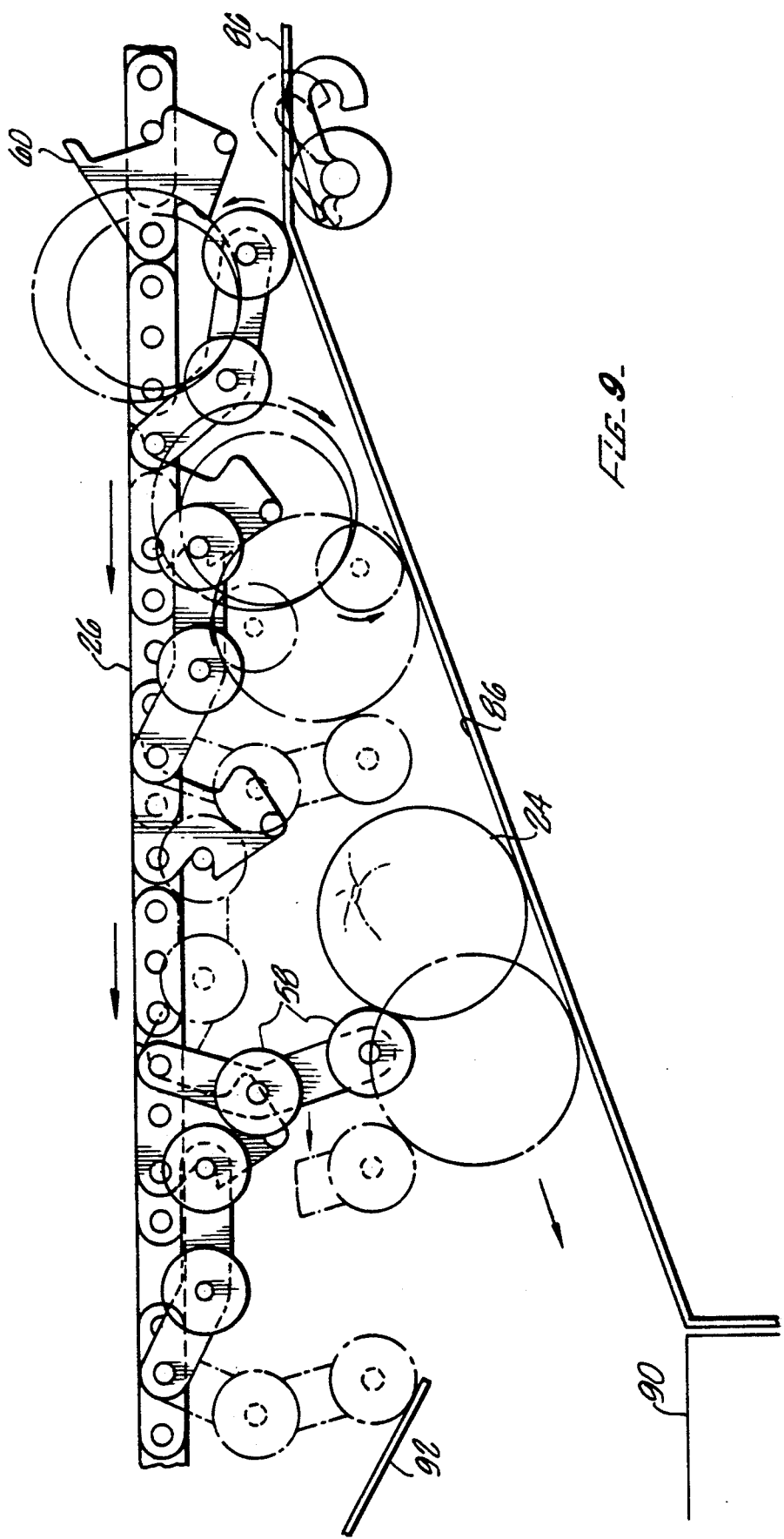
FIG. 9 is a partial side view of the conveyor illustrating an off-loading ramp with product units being distributed thereto.

In FIG. 9, off-loading ramps 86 are positioned beneath the conveyor 10 at the off-loading stations. The ramp 86 is shown to include an inclined section 88 positioned relative to the conveyor 10 such that the release of a carriage 40 will cause the roller 58 most adjacent the free end of the carriage 40 to contact the ramp 86 without releasing a product unit 24. As the conveyor 10 continues to move, the released carriage 40 moves along the ramp 86 and drops downwardly, finally releasing the product unit 24 onto the ramp 86 where it can roll away from the conveyor depending on the direction of slope thereof. The roller 58 which contacts the ramp 86 is caused to rotate. This can rotate the product unit 24. The rotation of the product unit 24 is clockwise as seen in FIG. 9 prior to the product unit 24 actually contacting the ramp 86. This rotation can allow the product unit 24 to move out of the cavity without hanging up when the carriage 40 continues to pivot downwardly.

A belt 90 is illustrated running perpendicular to the conveyor 10 for directing the off-loaded products toward storage or packing. As multiple off-loading stations are contemplated, upwardly inclined ramps 92 may be positioned ahead of subsequent ramps 86 to allow the released roller carriages 40 to ride up and over succeeding ramps.

Accordingly, an improved conveying system for product units such as produce has been shown and described. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A conveyor comprising
   a support structure defining a conveying path;
   an endless chain mounted on said support structure to extend along said conveying path;
   roller carriages movably mounted on said chain;
   rollers rotatably mounted to said roller carriages, said rollers extending laterally of said chain and defining cavities for conveying along said conveying path, said roller carriages being movably mounted to move selectively said rollers downwardly away from said conveying path;
   elongate members mounted to said chain and extending laterally of said chain, said elongate members being positioned higher than said rollers when on said conveying path;
   control members mounted on said chain to selectively control movement of said roller carriages.

2. The conveyor of claim 1 wherein said elongate members extend laterally of said chain a distance substantially the same as said rollers.

3. The conveyor of claim 2 wherein the distal ends of said elongate members include downwardly tapered surfaces on the tops thereof.

4. The conveyor of claim 1 wherein said rollers are between adjacent said elongate members in a first, conveying position.

5. The conveyor of claim 4 wherein said rollers and said elongate members form cavities laterally of said chain for conveying along said conveying path with said rollers in said first, conveying position.

6. The conveyor of claim 5 wherein said rollers are displaced from forming said cavities with said rollers in a second, off-loading position.

7. The conveyor of claim 6 wherein there are two said rollers between each adjacent said elongate members.

8. The conveyor of claim 1 wherein each said roller carriage is pivotally mounted laterally of said chain.

9. The conveyor of claim 8 wherein said roller carriages include right handed carriages mounted to a first side of said chain and left handed carriages mounted to a second side of said chain.

10. The conveyor of claim 1 further comprising a rotation track mounted on said support structure and extending along a portion of said conveying path beneath said rollers to contact said rollers.

11. The conveyor of claim 10 wherein there is a plurality of said rotation tracks along said conveying path.

12. The conveyor of claim 1 wherein said rollers are bowtie rollers.

13. The conveyor of claim 1 further comprising a weigh station on said support structure beneath said rollers when on said conveying path to support said rollers thereon.

14. The conveyor of claim 1 further comprising a ramp positioned beneath said rollers adjacent said conveying path, said ramp being inclined downwardly in the direction of movement along said conveying path.

15. The conveyor of claim 14 wherein the upper end of said ramp is immediately adjacent and not touching said rollers with said rollers controlled by said control members not to move away from said conveying path.

16. The conveyor of claim 15 wherein a said roller of a said roller carriage touches the upper end of said ramp with said rollers of said roller cage controlled by a said control member to move away from said conveying path.

17. The conveyor of claim 16 wherein the lower end of said ramp is displaced from said conveying path such that the lower end does not touch said rollers with said rollers moved away from said conveying path.

18. The conveyor of claim 16 wherein said rollers roll on said ramp when touching said ramp.

19. A conveyor comprising
   a support structure defining a conveying path;
   an endless chain mounted on said support structure to extend along said conveying path;
   roller carriages movably mounted on said chain;
   rollers rotatably mounted to said roller carriages, said rollers extending laterally of said chain and defining cavities for conveying along said conveying path, said roller carriages being movably mounted to move selectively said rollers downwardly away from said conveying path;
   control members mounted on said chain to selectively control movement of said roller carriages, said control members including pivotally mounted hooks and said roller carriages including pins displaced from the pivotal mounting of said roller carriages to engage said hooks, respectively, said hooks being selectively pivotable from engagement with said pins.

20. The conveyor of claim 19 wherein said hooks are biased toward engagement with said pins when on said conveying path.

21. The conveyor of claim 19 wherein said roller carriages each include a first, conveying position and a second, off-loading position, said pin being engaged with said hooks and said roller carriages extending substantially longitudinally of said conveying path in said first position, said roller carriages extending downwardly of said conveying path in said second position when on said conveying path.

22. A conveyor comprising
a support structure defining a conveying path;
an endless chain mounted on said support structure to extend along said conveying path;
members extending laterally from said chain at a first level, said members being mutually spaced along said chain;
mounts operatively mounted to said chain;
rollers rotatably mounted to said mounts to extend laterally of said chain, said mounts and said rollers including first, conveying positions and second, off-loading positions, said rollers being located between adjacent said members along said chain and at a second level below said first level when on said conveying path in said first, conveying positions, said rollers in said first, conveying positions and said members defining cavities along said chain, and said rollers being displaced downwardly when in said second, off-loading positions along said chain from said first, conveying positions;
control members mounted on said chain to control selection of said first, conveying and second, off-loading positions.

23. The conveyor of claim 22 wherein said members extend laterally of said chain a distance substantially the same as said rollers.

24. The conveyor of claim 22 wherein the distal ends of said members include downwardly tapered surfaces on the tops thereof.

25. The conveyor of claim 22 further comprising roller carriages, each said roller carriage including a said member and a said mount.

26. The conveyor of claim 22 wherein said mounts are pivotally mounted laterally of said chain and rotatable downwardly relative to said chain when on said conveying path.

27. The conveyor of claim 26 wherein two said rollers are mounted to each said mount.

28. The conveyor of claim 26 wherein said mounts are pivotally mounted coaxially with said members.

29. The conveyor of claim 26 wherein said mounts include right handed mounts mounted to a first side of said chain and left handed mounts mounted to a second side of said chain, said rollers extending from said mounts outwardly away from said chain.

30. The conveyor of claim 26 wherein said control members include pivotally mounted hooks and said mounts include pins displaced from the pivotal mounting of said mounts to engage said hooks, respectively, said hooks being selectively pivotable from engagement with said pins.

31. The conveyor of claim 30 wherein said hooks are biased toward engagement with said pins when on said conveying path.

32. The conveyor of claim 22 wherein said rollers are bowtie rollers.

33. The conveyor of claim 32 wherein two said rollers are mounted to each said mount to define a cavity therebetween.

34. The conveyor of claim 22 further comprising a rotation track mounted on said support structure and extending along a portion of said conveying path beneath said rollers to contact said rollers.

35. The conveyor of claim 34 wherein there is a plurality of said rotation tracks along said conveying path.

36. The conveyor of claim 22 further comprising a weigh station on said support structure beneath said rollers when on said conveying path to support said rollers thereon.

37. The conveyor of claim 22 further comprising a ramp positioned beneath said rollers adjacent said conveying path, said ramp being inclined downwardly in the direction of movement along said conveying path.

38. The conveyor of claim 37 wherein the upper end of said ramp is immediately adjacent and not touching said rollers with said rollers in said first, conveying positions.

39. The conveyor of claim 38 wherein a said roller of a said roller carriage touches the upper end of said ramp with said rollers of said roller displaced downwardly from said first, conveying positions.

40. The conveyor of claim 39 wherein the lower end of said ramp is displaced from said conveying path such that the lower end does not touch said rollers with said rollers moved away from said conveying path.

41. The conveyor of claim 39 wherein said rollers roll on said ramp when touching said ramp.

42. A conveyor comprising
a support structure defining a conveying path;
an endless chain mounted on said support structure to extend along said conveying path;
members extending laterally from said chain at a first level, said members being mutually spaced along said chain;
mounts mounted on said chain selectively pivotable downwardly relative to said chain when on said conveying path about an axis extending laterally of said chain;
rollers rotatably mounted to said mounts to extend laterally of said chain, said mounts and said rollers including first, conveying positions and second, off-loading positions, said rollers being located between adjacent said members longitudinally along said chain and at a second level below said first level when on said conveying path in said first, conveying positions, said rollers in said first, conveying positions and said members defining cavities along said chain, and said rollers being displaced downwardly when in said second, off-loading positions along said chain from said first, conveying positions;
control members mounted on said chain to selectively prevent rotation of said roller carriages from said first, conveying positions to said second, off-loading positions.

43. The conveyor of claim 42 further comprising a ramp positioned beneath said rollers adjacent said conveying path, said ramp being inclined downwardly in the direction of movement along said conveying path.

44. The conveyor of claim 43 wherein the upper end of said ramp is immediately adjacent and not touching said rollers with said rollers in said first, conveying positions.

45. The conveyor of claim 44 wherein a said roller of a said roller carriage touches the upper end of said ramp with said rollers of said roller cage controlled by a said control member to move away from said conveying path.

46. The conveyor of claim 45 wherein the lower end of said ramp is displaced from said conveying path such that the lower end does not touch said rollers with said rollers moved away from said conveying path.

47. The conveyor of claim 45 wherein said rollers roll on said ramp when touching said ramp.

48. A conveyor comprising
a support structure defining a conveying path;
an endless chain mounted on said support structure to extend along said conveying path;
roller carriages movably mounted on said chain;
rollers rotatably mounted to said roller carriages, said rollers extending laterally of said chain and defining cavities for conveying along said conveying path, said roller carriages being movably mounted to move selectively said rollers downwardly away from said conveying path;
control members movably mounted on said chain, said control members selectively extending into the path of downward movement relative to said chain of said movably mounted roller carriages, respectively;
a cam movably mounted to said support structure to extend selectively into the path of travel of said control members along said conveying path.

49. The conveyor of clam 48 further comprising elongate members mounted to said chain and extending laterally of said chain.

50. The conveyor of claim 49 wherein said elongate members are positioned higher than said rollers when on said conveying path.

51. The conveyor of claim 50 wherein said elongate members extend laterally of said chain a distance substantially the same as said rollers.

52. The conveyor of claim 51 wherein the distal ends of said elongate members include downwardly tapered surfaces on the tops thereof.

53. The conveyor of claim 50 wherein said rollers are between adjacent said elongate members in a first, conveying position.

54. The conveyor of claim 53 wherein said rollers and said elongate members form cavities laterally of said chain for conveying along said conveying path with said rollers in said first, conveying position.

55. The conveyor of claim 54 wherein said rollers are displaced from forming said cavities with said rollers in a second, off-loading position.

56. The conveyor of claim 55 wherein there are two said rollers between each adjacent said elongate members.

57. The conveyor of claim 48 wherein each said roller carriage is pivotally mounted laterally of said chain.

58. The conveyor of claim 57 wherein said roller carriages include right handed carriages mounted to a first side of said chain and left handed carriages mounted to a second side of said chain.

59. A conveyor comprising
a support structure defining a conveying path;
an endless chain mounted on said support structure to extend along said conveying path;
roller carriages movably mounted on said chain;
rollers rotatably mounted to said roller carriages, said rollers extending laterally of said chain and defining cavities for conveying along said conveying path, said roller carriages being movably mounted to move selectively said rollers downwardly away from said conveying path;
control members movably mounted on said chain, said control members selectively extending into the path of downward movement relative to said chain of said movably mounted roller carriages, respectively, said control members including pivotally mounted hooks and said roller carriages including pins displaced from the pivotal mounting of said roller carriages to engage said hooks, respectively, said hooks being selectively pivotable from engagement with said pins.

60. The conveyor of claim 59 wherein said hooks are biased toward engagement with said pins when on said conveying path.

61. The conveyor of claim 59 wherein said roller carriages each include a first, conveying position and a second, off-loading position, said pin being engaged with said hooks and said roller carriages extending substantially longitudinally of said conveying path in said first position, said roller carriages extending downwardly of said conveying path in said second position when on said conveying path.

* * * * *